United States Patent
Bakker Lee et al.

(10) Patent No.: US 9,071,689 B2
(45) Date of Patent: Jun. 30, 2015

(54) MESSAGE BACKUP FACILITIES

(71) Applicant: Replay Forever, LLC, New York, NY (US)

(72) Inventors: Angela Bakker Lee, Philadelphia, PA (US); Gregory Welteroth, Montoursville, PA (US)

(73) Assignee: REPLAY FOREVER, LLC, New York, NY (US)

( * ) Notice: Subject to any disclaimer, the term of this patent is extended or adjusted under 35 U.S.C. 154(b) by 6 days.

(21) Appl. No.: 13/891,226

(22) Filed: May 10, 2013

(65) Prior Publication Data

US 2013/0301812 A1    Nov. 14, 2013

Related U.S. Application Data

(60) Provisional application No. 61/645,904, filed on May 11, 2012.

(51) Int. Cl.
*H04M 1/64* (2006.01)
*H04M 3/533* (2006.01)

(52) U.S. Cl.
CPC .......... *H04M 3/533* (2013.01); *H04M 3/53366* (2013.01); *H04M 2203/301* (2013.01); *H04M 2203/4563* (2013.01); *H04M 2203/558* (2013.01)

(58) Field of Classification Search
CPC   H04M 3/42221; H04M 1/276; H04M 1/6505
USPC ...................... 379/68, 88.17, 88, 89; 455/413
See application file for complete search history.

(56) References Cited

U.S. PATENT DOCUMENTS

| | | | |
|---|---|---|---|
| 4,935,954 A * | 6/1990 | Thompson et al. | 379/88.04 |
| 5,822,405 A * | 10/1998 | Astarabadi | 379/88.04 |
| 7,190,950 B1 * | 3/2007 | Baker et al. | 455/413 |
| 7,769,364 B2 * | 8/2010 | Logan et al. | 455/413 |
| 7,945,028 B2 | 5/2011 | Hagale et al. | |
| 7,957,514 B2 | 6/2011 | Sahai | |
| 7,995,711 B2 | 8/2011 | Hirschberg et al. | |
| 8,019,058 B2 | 9/2011 | Klassen et al. | |
| 8,060,065 B1 | 11/2011 | Lai et al. | |
| 8,064,577 B2 | 11/2011 | Lemieux | |
| 8,102,977 B2 | 1/2012 | Baker et al. | |

(Continued)

OTHER PUBLICATIONS

Voicemailsforever, get the message!, Voicemail Express, pp. 1-3, May 8, 2013, http://www.voicemailsforever.com/save-voicemail/.

*Primary Examiner* — Fan Tsang
*Assistant Examiner* — Van D Huynh
(74) *Attorney, Agent, or Firm* — Heslin Rothenberg Farley & Mesiti P.C.; Matthew M. Hulihan

(57) ABSTRACT

Facilities are provided herein for backing up messages and related activities. An active telephone call is initiated to a voicemail server and recording of the audio stream of the active telephone call is initiated to record a voicemail message being played back during the telephone call. The recorded voicemail message may then be edited, tagged, enhanced, organized with other messages, and shared, as examples. In another aspect, backup of messages is facilitated by an intermediary system that establishes an active telephone call between a voicemail server and a client. The intermediary system passes a request from the client to the voicemail server to commence playback of a voicemail message, and the intermediary system records a portion of the audio stream of the active telephone call.

29 Claims, 7 Drawing Sheets

(56) References Cited

U.S. PATENT DOCUMENTS

| | | |
|---|---|---|
| 8,116,299 B2 | 2/2012 | Gits et al. |
| 8,121,263 B2 | 2/2012 | Yao et al. |
| 8,130,919 B2 | 3/2012 | Kalbag |
| 2005/0186944 A1 | 8/2005 | True et al. |
| 2006/0025113 A1 | 2/2006 | Nguyen et al. |
| 2007/0041522 A1 | 2/2007 | Abella et al. |
| 2009/0119100 A1 | 5/2009 | Akella et al. |
| 2010/0020947 A1* | 1/2010 | Van Gundy et al. ....... 379/88.17 |

* cited by examiner

MESSAGE BACKUP FACILITIES

CROSS REFERENCE TO RELATED APPLICATIONS

This application claims priority under 35 U.S.C. §119(e) to U.S. Provisional Patent Application No. 61/645,904 filed May 11, 2012 entitled, "MESSAGE STORE APPLICATION," the content of which is hereby incorporated herein by reference in its entirety.

BACKGROUND

Millions of voice and text messages are communicated between parties each day through various telecommunications services or message storage devices. Typically, users access these messages using cellular (or other mobile) devices, or home/office telephones, that retrieve and store their messages. In some cases, the telecommunications provider or device (such as an answering machine) retains the message until, for instance, a quota is reached or a time period for storing the message lapses. In cases where the message is not retained by the telecommunication service and the mobile device on which the message was received is lost, stolen, or otherwise unable to replay the message for the user, the message is generally lost. What is needed is a persistent message backup service that enables a user to backup messages, perhaps that were previously received, with a service separate from the telecommunications service or device that was used to initially receive the message for the user, and that enables access to those backed up messages in a manner that is independent from both the telecommunications service provider and any device at which the message was initially received.

BRIEF SUMMARY

The shortcomings of the prior art are overcome and additional advantages are provided through the provision of a method for backing up one or more messages, the method comprising initiating, by a processor of a computing system, establishment of an active telephone call to a voicemail server of a telecommunications service, the voicemail server storing a voicemail message, initiating recording of at least a portion of an audio stream of the active telephone call, the portion of the audio stream comprising the voicemail message, storing the recorded portion of the audio stream, wherein the stored portion of the audio stream comprises the voicemail message, and sending the voicemail message to a remote backup server for backup of the voicemail message.

In a further aspect, a computing system is provided for backing up one or more messages. The computing system comprises a memory and a processor in communications with the memory, wherein the computing system is configured to perform a method comprising initiating establishment of an active telephone call to a voicemail server of a telecommunications service, the voicemail server storing a voicemail message, initiating recording of at least a portion of an audio stream of the active telephone call, the portion of the audio stream comprising the voicemail message, storing the recorded portion of the audio stream, wherein the stored portion of the audio stream comprises the voicemail message, and sending the voicemail message to a remote backup server for backup of the voicemail message.

In yet a further aspect, a computer program product is provided for backing up one or more messages. The computer program product comprises a tangible storage medium storing program instructions readable by a processor of a computing system for execution to perform a method comprising initiating, by the processor of the computing system, establishment of an active telephone call to a voicemail server of a telecommunications service, the voicemail server storing a voicemail message, initiating recording of at least a portion of an audio stream of the active telephone call, the portion of the audio stream comprising the voicemail message, storing the recorded portion of the audio stream, wherein the stored portion of the audio stream comprises the voicemail message, and sending the voicemail message to a remote backup server for backup of the voicemail message.

In an additional aspect, a method is provided to facilitate backing up one or more voicemail messages. The method comprises establishing, by a processor of an intermediary system, an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message, passing to the voicemail server a request from the client computing system to begin playback of the voicemail message, and commencing recording of at least a portion of the audio stream, the portion of the audio stream comprising the voicemail message.

Further, an intermediary system to facilitate backing up one or more voicemail messages is provided. The intermediary system comprises a processor and a memory in communication with the processor, wherein the intermediary system is configured to perform a method comprising: establishing an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message, passing to the voicemail server a request from the client computing system to begin playback of the voicemail message, and commencing recording of at least a portion of the audio stream, the portion of the audio stream comprising the voicemail message.

Still further, a computer program product is provided to facilitate backing up one or more voicemail messages. The computer program product comprises a tangible storage medium storing program instructions readable by a processor of an intermediary system for execution to perform a method comprising: establishing, by the processor of the intermediary system, an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message, passing to the voicemail server a request from the client computing system to begin playback of the voicemail message, and commencing recording of at least a portion of the audio stream, the portion of the audio stream comprising the voicemail message.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
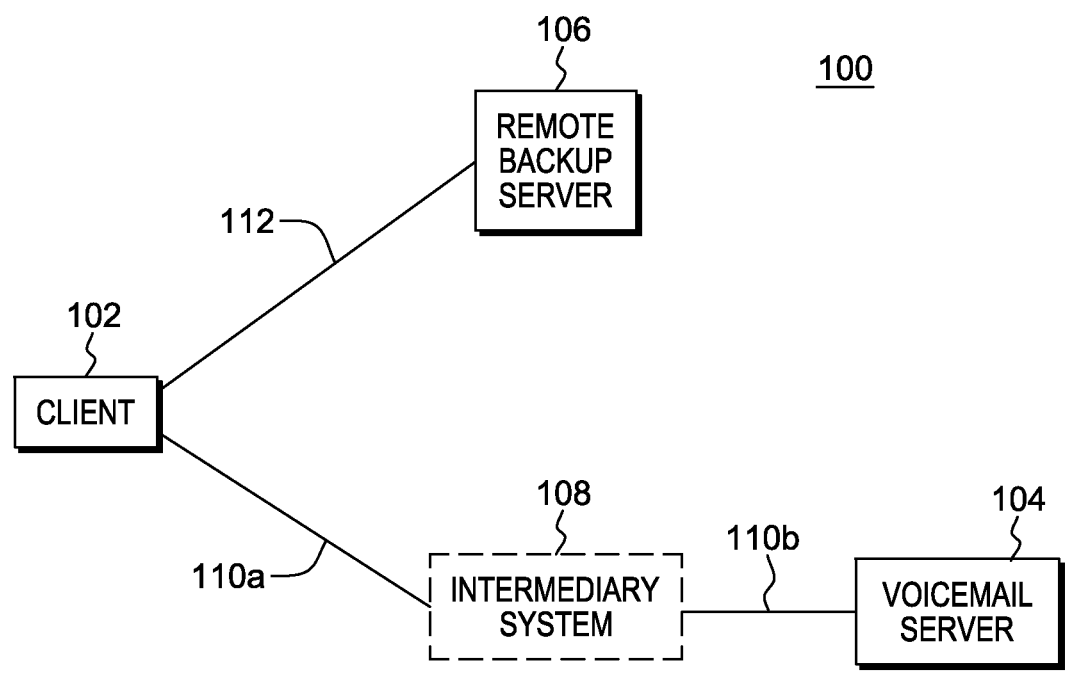
FIG. 1 depicts one example of an environment to incorporate and use one or more aspects described herein.

Aspects described herein facilitate backing up of a user's received voicemail and text messages to, for instance, one or more servers, such as central cloud based server(s). Additionally, message organization, retrieval, viewing/playing, editing, and sharing facilities may be provided as described herein.

Client software for facilitating aspects described herein runs/executes on a client computing system. In one example, client software executes as a mobile application ('app') on a mobile device that communicates with one or more other systems/devices, such as a remote backup server, via Web services. For convenience, some aspects of client software are described herein using a mobile application as an example, though it should be appreciated that client software could be any application executing on any type of computing system, and need not be a mobile application that executes on a mobile device.

Thus, in some examples a client computing system is, for instance, a mobile device. Examples of mobile devices include smartphones and tablet computers, such as devices running an iOS-based operating system offered by Apple Inc, Cupertino, Calif., USA (i.e. iPhone® and iPad®), Android-based operating system offered by the Open Handset Alliance, or Blackberry® OS operating system offered by Research In Motion, Waterloo, ON, Canada. Additional mobile device types are also contemplated. In general, a user can manage and use aspects described herein from any mobile device (such as any smartphone), tablet computer (such as an Apple® iPad® or other tablet computer), or from a laptop or other personal computer. Even more generally, a computing system is any device capable of executing program code to perform functions described herein.

In one example, a client computing system interacts with one or more remote backup servers having one or more resident databases. A resident database on a server can provide the storage for messages, for instance text messages, such as SMS or MMS message, and voicemail messages (also referred to herein as "voice messages") received by way of a telecommunications service, such as a cellular or landline telephone service. In some examples, the messages may be retrieved by a client computing device and uploaded to one or more remote backup servers, tagged, and associated with a user's account.

In some embodiments, voice messages previously stored at a client computing device can be uploaded by an application (such as a mobile app executing on a mobile device) to a remote backup server. A voice message left for a user may initially be held/stored at a voicemail server of a telecommunications service provider, such as a cellular telephone service provider, and the application may cause the mobile device to communicate with the voicemail server, perhaps by way of a intermediary device, to retrieve and record the voicemail message locally on the mobile device and/or stream or otherwise upload the message to a remote backup server. Thus, in one embodiment, the voicemail messages already left for the user by one or more other users and stored on the telecommunications service provider's server(s) can be recorded, retrieved by the client computing device, and then automatically uploaded to the remote backup server.

At initial setup of a message backup service as described herein, messages residing on the client computing device, as well as messages residing externally (such as residing on voicemail server(s) of a cellular telephone service provider) can be backed up. This captures messages that were received at the mobile device and/or voicemail server(s) prior to signing up for the service, including those messages that were deleted from the carrier's server(s) but nevertheless still exist on the mobile device, or vice versa. Thus, during initial setup, a mobile application on a mobile device, for instance, can upload to storage of the user's account on a remote backup server messages that exist on the mobile device and that are accessible to the mobile application. Additionally, in some embodiments, messages that exist externally on a voicemail server but either do not exist on the mobile device, or do exist on the mobile device but are not accessible to the application on the mobile device, can be recorded and uploaded as described herein. Examples of voicemail messages that exist on a voicemail server but may not exist on the mobile device include messages that were newly received by the cell service providers' server but which the mobile device is not yet made aware of. In many cases, a message may be provided to the mobile device, which can then provide, by way of the mobile application, the message to the remote backup server.

During ongoing operation of the application after initial setup, when a new message arrives at a voicemail server or arrives at the mobile device, the client computing device (for instance the mobile app executing thereon) may become aware of the new message's arrival because the client computing device acquires knowledge of the presence of the new message. For instance, a mobile application can employ data mining techniques to determine how many and which messages have been received by the telecommunications service but are not yet uploaded to a remote backup server. The mobile application may then initiate retrieval of the message by the mobile device (if not already retrieved), so that the message is received by the mobile device and then can be sent to a remote backup server. In some embodiments, an intermediary device between the client computing device and the voicemail server (which intermediary device may itself be included as part of the remote backup server) connects directly to the voicemail server to receive the voicemail message under program control of the client computing device application, rather than pulling the messages from the mobile device.

After a message is sent (in the case of a text message) or left (in the case of a voicemail message) for a recipient and is stored on a telecommunications service's server or is received directly by the handset (such as in the case of SMS messages), the mobile device may receive an indication that a new message was received. In some cases where the message is a voicemail, the voicemail can be obtained and stored at the client computing device and/or caused to be uploaded by the mobile application to a remote backup server. In one example, the voicemail is pushed to the mobile device automatically, while in other examples, an active telephone call is placed to the voicemail server and the voicemail message is recorded as it is played back during the active telephone call. For instance, the mobile app itself may cause the mobile device to dial and retrieve the new message, which can then be recorded at the mobile device or an intermediary device and/or streamed to a remote backup server. In yet another example, the mobile application can indicate to a remote device, such as a central server or remote backup server, that a new voicemail message was received. The remote device can dial into the voicemail server and obtain the message directly by causing the voicemail server to playback the message, and then recording the message during the voicemail message playback.

As is the case with some mobile devices, such as the iPhone®, there is not always consistency between which messages (if any) are stored on the mobile device and which messages (if any) are stored on a voicemail server. Aspects described herein account for this and may retrieve messages from both locations. In this manner, for some messages stored on the mobile device, they may be read from the mobile device and backed up to a remote backup server, and messages subsequently received during ongoing provision of a service as described herein can be backed up to a remote backup server from the telecommunications service via the mobile device. If a message resides on a voicemail server, the mobile application, in one example, can cause the message to be obtained from the voicemail server and provided to and stored by a remote backup server, for instance in an appropriate format (e.g. way, mp3, etc). The mobile application can, for instance, record the voicemail message, or cause the voicemail message to be recorded, as it is played back from the voicemail server. The application can then upload the message, or cause the message to be uploaded, to a remote backup server and/or pipe the message to the remote backup server as the message is received from the voicemail server. Thus, in this example, the mobile application can record the message onto the mobile device when the message is streamed to the mobile device from the carrier, and can also retrieve information about the message, such as information indicating the sender of the message. Then, the message and corresponding information may be uploaded to the remote backup server. In one particular embodiment, the mobile application can begin uploading the message to the remote backup server before the message is fully received at the mobile device (i.e. as the message is being streamed to the mobile device from the voicemail server). Alternatively or additionally, the message can be received and recorded in full at the mobile device or elsewhere, and then uploaded to the remote backup server, or multiple messages can be recorded on the mobile device or elsewhere, and uploaded in batch to the remote backup server, as examples.

FIG. 1 depicts one example of an environment to incorporate and use one or more aspects described herein. As depicted in FIG. 1, environment 100 includes a client computing system 102 in communication with both a voicemail server 104 (across communication path(s) 110) and a remote backup server 106 (across communication path 112). Client computing system 102, voicemail server 104, and remote backup server 106 may each comprise one or more data processing systems. Remote backup server 104 may actually comprise a plurality of remote backup servers. Although only a single voicemail server is depicted in FIG. 1, it is understood that aspects described herein may work with a plurality of voicemail servers, for instance one for each phone number registered with the user's account for backing up of the messages received at each registered phone number. A communication path can comprise any suitable communication path for communications between components. It can include one or more digital or analog connections operating via wired or wireless (or a combination thereof) technology to facilitate communication between components. As non-limiting examples, it can include a direct connection or path between two components, or it can include a series of interconnections, for instance network connections such as a local area network (LAN), a wide area network (WAN), a token ring, or Ethernet connections utilizing routers, switches, and/or hubs. When a communication path incorporates wireless communication, any suitable wireless technology can be employed. By way of specific examples, wireless connection technology such as RF, Wi-Fi, WLAN, Bluetooth, ZIGBEE, cellular, or any other suitable wireless communication protocol and supporting hardware may be employed. The communication path could comprise audio and/or video connections for passing audio and/or video between the components.

Environment 100 may also include an intermediary system 108 to retrieve voice and/or text messages from a server of the telecommunications service. Intermediary system 108 is a separate component acting as a proxy between client 102 and voicemail server 104. In one specific example, intermediary system 108 includes call switching functionality, for instance voice over Internet Protocol switching capability as a Private Branch Exchange (PBX) device. The switch may dial the voicemail server, and, under program control, retrieve/download/record the messages from the voicemail server. For instance, in some examples, the switch can record the messages as the messages are played by the voicemail server and received in the audio stream of the call. The recorded messages can then be saved to a remote backup server and/or the client device. Intermediary system 108 is an optional component in that, in some embodiments, aspects described herein are facilitated absent involvement of an intermediary system, as described below.

In one embodiment, client 102 is a mobile telephone running an Android-based mobile operating system and including a telephone calling facility. Client 102 may use the telephone calling facility to place a call to voicemail server 104 which has stored a received voicemail message. The client may then directly control the playback of that voicemail to the client during the call using dual-tone multi-frequency (DTMF) signaling, for instance, and the client can control recording of that voicemail message. The call may be recorded at the client by the client application as an audio waveform, then processed and uploaded to remote backup server 106 and associated with a user's account. In this example, no intermediary system 108 is needed.

In another embodiment, an intermediary system 108 is used for placing a call to voicemail server 104. Client 102 is, in this example, an iPhone® which calls voicemail server 104 through an intermediate voice switch (e.g. a VoIP switch of intermediary system 108). For instance, a custom created VoIP dialer of client 102 can dial to the voice switch which may then connect the call to the voicemail server. The active phone call can be piped through intermediary system 108 to client 102, which can record the audio stream of the call. Additionally or alternatively, the recording may be done at intermediary system 108, since the audio stream of the call passes through the intermediary system. In any case, the recorded audio stream, or a portion thereof, can then be uploaded to remote backup server 106.

In some examples, the client software incorporates a Session Initiation Protocol (SIP) protocol dialer for controlling the call to the voicemail server.

In the example of FIG. 1 remote backup server 106 and intermediary system 108 are shown as separate components which may or may not be located at a same location. However, in some embodiments, backup server 106 and intermediary system 108 are a single component or part of a common component between client 102 and voicemail server 104. For instance, a remote backup server could incorporate functionality of the intermediary system, or vice versa.

Client software described herein can incorporate various functionality for backing up messages and other related features, such as sharing messages with other users. In some examples, client software facilitates creation of user accounts and profiles. It can facilitate selection by the user between different levels of a subscription plan for the backup service, as well as provision of a number and indication of phones or telephony services to be associated with the user account (and from which uploaded messages may be provided), in addition to an indication of a telecommunications service provider associated with each of the phone numbers. Additionally, the client software can facilitate (i) provision of user personal information during sign up for the service, (ii) provision of phone information for a user's own phone and also for other users' phones with whom messages are to be shared, (iii) entry of credit card information to accept payment form the user for use of the service, (iv) selection of an account name and password, (v) reading of identifying information that, for instance, a carrier provides along with a message, and (vi) provision of that identifying information and messages to the remote backup server(s). Mobile client software can, in some embodiments, also enable creation of folders and management of the messages stored on the remote backup server(s) for the users, as needed.

An example is now described of setting up an account for a message backup service as described herein. The example is provided with reference to an application running on a mobile telephone, though similar processes can be used to setup an account at any other type of computing system, such as a PC, laptop, or tablet computer.

When the application is initially launched, a display is provided with buttons that a user can select to setup an account, or login (if the user already has an account). Assuming the user selects to setup an account, a New Account screen is provided that enables the user to input an email address and password (twice, for confirmation) that is to be used for account login. In one example, an alphanumeric keyboard is presented on the screen for typing in the email address and password. A link to terms and conditions of the service may be provided in this interface. The user can select a Next button to both agree to the terms and conditions as well as progress to a Login screen. At the Login screen, the user enters the email address and password associated with the newly created account, for instance using the on-screen alphanumeric keyboard. In one example, a selection box is provided that can be selected to keep the user logged in to the service, rather than having to login each time the user launches the application.

If the user has forgotten his/her password, a button is provided that, when selected, can present an explanation of steps to reset the forgotten password.

After the user inputs the email address and correct password, then user is logged in and taken to an Account Setup screen to finish setting up the account. The Account Setup screen provides direction for the user to register one or more phone numbers where the user receives voice and/or text messages (home phone, work phone, mobile phone, etc.). An Add Phone button may be provided to register a phone for this account. When the user selects to add a phone number, an Add Phone Number interface is provided in which the user can input the 10-digit phone number and may also input a pin code (typically, but not always, 4 digits) used to access the voicemail box, for instance. A number keypad can be provided on the screen for entry of the phone number and pin.

In some embodiments, a dropdown menu listing various telecommunications service providers (AT&T®, Verizon®, T-Mobile®, Sprint®, etc.) is provided. Selection of the proper telecommunication service provider can be used to identify the proper means by which the voicemail server for that provider is to be accessed. Some providers enable access to the voicemail server by making a call to a particular number, such as *86 or the telephone number of the phone, in order to reach the voicemail server. Additionally or alternatively, a link can be provided in the interface for the user to click for an explanation of how to identify the service provider for the particular phone number being registered.

Once the phone number, pin, and service provider are entered, the user can select a button to register the phone. The next interface presented to the user can list the registered phones for the user's account. A selection can be provided to delete/remove a registered phone number from the account. Additionally, a button to add another phone can be provided, which, when selected, again presents the add phone number interface as before. In some embodiments, the number of phone numbers that a user is allowed to add to an account is limited to a particular number, such as three. The user may be allowed to add additional numbers for a set or varying fee. A free account may enable, for instance, three phone numbers to be registered. If the user wishes to register a fourth, the user may be charged a set fee, which may be a one-time fee or may be a recurring fee.

At this point, the user may select that he/she is done, to take the user to an Account Ready screen. The Account Ready screen explains, in one example, that use of the service is free, which enables free access to all backed-up voicemail and text messages in the account mailbox/storage. It can also indicate a website to which the user can navigate to access the account, including account settings as well as the messages backed-up using this account. The Account Ready screen can include a Next Step button that the user selects to both agree to the terms and conditions, as well as advance to an Account Activation screen. The Account Activation screen can indicate that the service will backup a first number of voicemail messages and a second number of text messages for free, but that backup of additional messages requires purchase of a package. The packages can be delivered as a recurring (weekly, monthly, yearly, etc.) subscription model that enables tiered-numbers of messages for backup each month. By way of specific examples, the packages can be $9.95 for backup of up to 10 messages per month, $19.95 for backup of up to 25 messages per month, or $39.95 for backup of up to 60 emails per month. In one example, when a user subscribes to any of the above packages, unlimited text message backup is included at no extra charge.

The user may select a package to which the user wishes to subscribe. Additionally, the user may toggle on/off text message backup.

The Account Activation screen can present Activate Now and Activate Later buttons. If the user has not selected a package and instead opts for only free service, the user can select Activate Later to be taken to a command screen described below with reference to FIG. 2. If instead the user selects a package and selects to activate the account now using the Activate Now button, then the user is presented with a Billing Setup screen to input billing information for payment for the package being purchased. For instance, a numeric keypad can be presented as part of the interface to allow for input of a credit card number, expiration month, care verification value (CVV/CVV2) code, and billing ZIP code. If the user has already associated credit cards with the account, a list of credit cards associated with the account is presented for selection by the user. The list can indicate all credit cards linked to the account and pre-authorized for billing. The user can select which credit card to use for payment of the package, and may also indicate a preferred credit card. Additionally, at the Billing Setup screen, a promo code field may be provided for inputting a promotional code for discounted or special services, as one example.

After account creation and activation (if purchasing a package), the backup service is up and running, and facilities of the application enable backing up of messages received at the mobile device and/or at voicemail servers of the telecommunications service providers of the registered phone numbers. For instance, in some cases, the application can read voice messages and text (such as SMS) messages received by the mobile device on which the application runs, such as a cellular telephone or other mobile device, and automatically synchronize incoming/received message(s) to remote backup server(s). "Received" messages include those messages received any time that reside on the mobile device or the voicemail server(s) for the mobile device. For instance, such received messages include both (i) messages received after the user has signed-up for the service and the application is actively backing up those messages, and also (ii) messages received by the mobile device or voicemail server(s) at any time prior to the user signing up for the service. The mobile client software can enable and/or provide recording and backup, to the remote backup server(s), of incoming/received messages for storage of the messages to the remote backup server(s).

Additionally, messages received by multiple different mobile devices and/or from multiple different voicemail servers can all be backed up and associated with a single user account. A user can have multiple telephony devices, for instance each having a different phone number. The messages received at each of the multiple phone numbers, including either at the different devices or the different voicemail server(s) thereof, can be backed up to the remote backup server(s). In one embodiment, each telephony device can be associated with a separate account of the remote backup server(s) and these multiple accounts are aggregated for a single account holder (user). Alternatively, the multiple devices can be associated with a single user account which has associated therewith multiple registered phone numbers as described above.

Additionally, messages stored in a user's account can be shared with other users. A separate fee structure can be attached to this sharing functionality, for instance one that charges a user per phone number with which a message is shared, or that charges a set fee to share a given message with maximum number recipients, as examples. Other fee structures, including variants of the above, are also possible.

After account creation and activation (if purchasing a package), the application can present a Command screen when the user logs in. The Command screen may be the screen from which many functions of the application can be invoked by a user.

Figure 2:
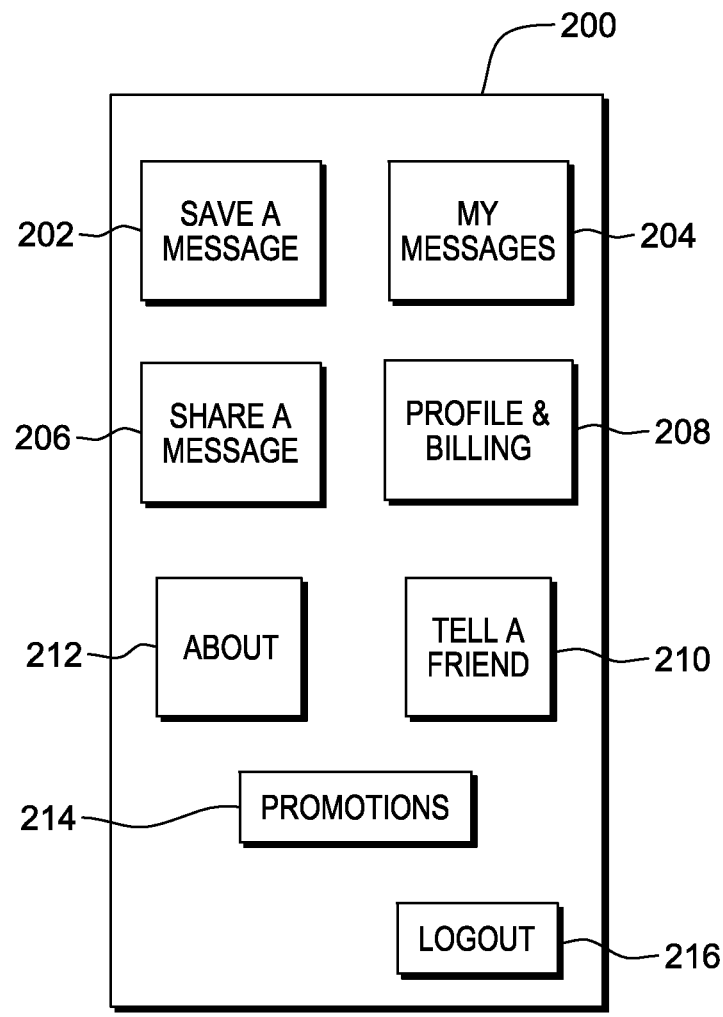
FIG. 2 depicts an example interface presented by an application of a client computing system, in accordance with aspects described herein.

The application presents the Command screen as an interface of the client computing device, and is described in further detail with reference to FIG. 2. Referring to FIG. 2, interface 200 includes the following buttons/functions: Save a Message 202, My Messages 204, Share a Message 206, Profile & Billing 208, Tell a Friend 210, About 212, Promotions 214, and Logout 216.

Selection of Logout button 216 will log the user out of the service.

The About button 212, when selected, displays text about the application, the backup service, etc., and can also include functions for Liking the app, app developer, or message backup service provider on social networks such as Facebook®. It can also include use and service policies such as a Terms & Conditions, Copyright Policy, Privacy Policy, etc, or links to website(s) that display such policies.

The Promotions button 214, when selected, can give a promotional code for discounted service. The code can, for instance, give a discount of $5.00 off a first month of use for a new user (and optionally a $5.00 credit for the user who referred the new user).

The Tell a Friend button 210, when selected, can launch an interface for texting/emailing a friend, or sharing or tweeting, via a social network such as Facebook® or LinkedIn®, or microblogging service such as Tumblr® or Twitter®, and optionally pre-filling the message with a message about the backup service and/or its provider.

The Profile & Billing button 208, when selected, can present interface(s) for viewing/editing the user's profile (personal information, registered phone numbers, etc.) and billing information, such as payment methods and/or package subscription information. As noted above, provision of one or more aspects described herein can be based on a subscription model, whereby a user pays a recurring (i.e. monthly, multi-monthly, yearly, etc) fee for access to his/her account and/or an additional level of service beyond the free service offered. A user can pay monthly, quarterly, yearly, etc. subscription management fees. In this regard, payment facilitates, such as credit card processing and PayPal® payment gateways, among others, can be integrated into the application and/or remote backup server(s) or intermediary systems to bundle the subscription payment services. The subscription management aspects can be built into the remote backup servers, as an example, to control user access to features or the additional level of service, such as to control operation of the mobile application to perform the backups, and/or control web-based access to the user's account.

Selection of the Save a Message button 202 can initiate saving (backing up) a message. As an example, a Save a New Voice Message screen can be displayed with guidance on how to save the message: First, a registered phone number is to be selected indicating the phone number to which the voicemail message was initially received. Second, playback of that message is initiated as part of a telephone call to the voicemail server, and the user can indicate when to start and stop recording of the audio stream that is received as part of that call. Third, confirmation can be given by the user that the recorded voicemail is to be saved and associated with the user's account. Additionally, an indication can be given that text message backup can be enabled simply by turning on auto-save of text messages (described above in connection with the Account Activation screen).

Thus, the interface presents a Select Phone Number screen for the user to indicate, for instance, where the message is (i.e. the phone number at which the voicemail message was left) that the user wishes to save with a secure remote backup server and associate with the user's account. The screen lists the phone number(s) that the user has associated with the user's account. After the user selects one of the phone numbers, the user can select to continue to a Play the Message Screen with a Call Now button displayed. Selection of the Call Now button will invoke a calling facility to place a call to the voicemail box (voicemail server) of that telephone number. The calling facility may be on the client system, for instance, and/or part of an intermediary system, as described below. After the user selects the Call Now button and the call is being placed to the voicemail box, the application may display an interface with a numeric keypad and an indication that the voicemail box is being called.

Figure 3:
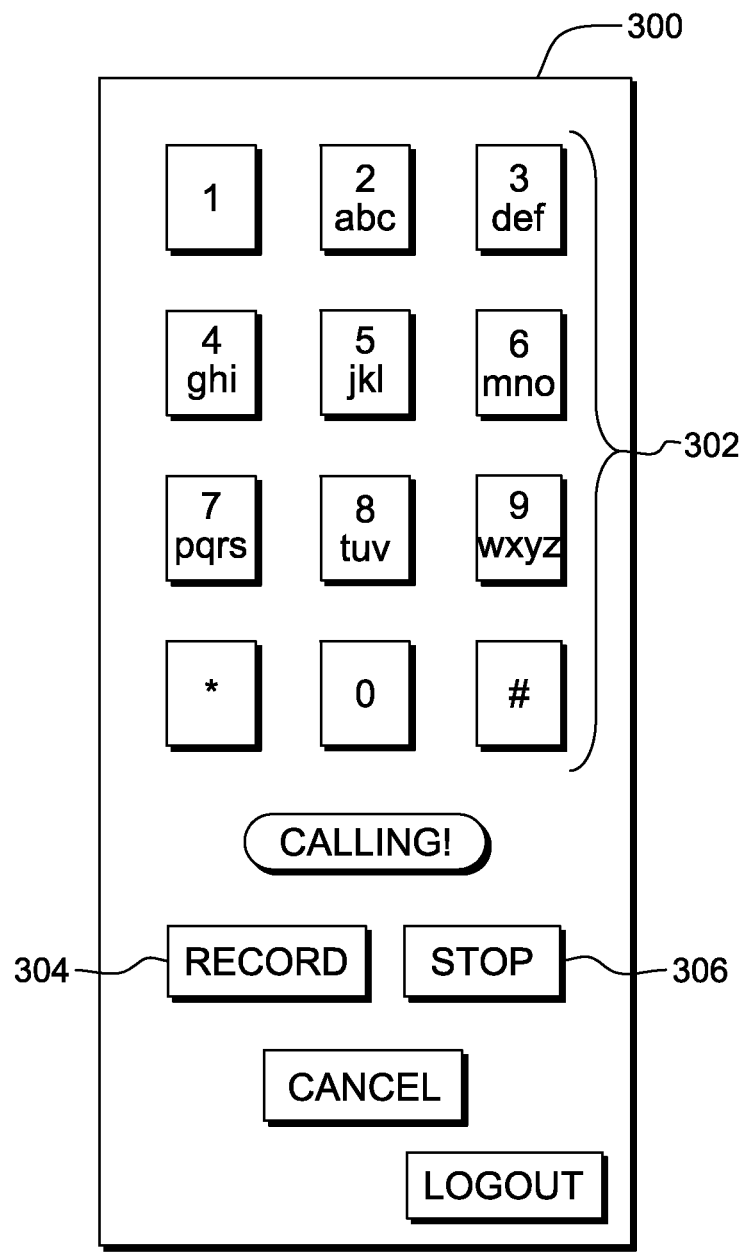
FIG. 3 depicts an example interface for controlling recording of a voicemail message, in accordance with aspects described herein.

This interface is used in one embodiment for controlling recording of a voicemail message, in accordance with aspects described herein, and is described with reference to FIG. 3. Interface 300 includes numeric keypad 302 which enables the user to enter the appropriate numerical prompts for the voicemail server to playback the voicemail desired to be saved. For instance, some voicemail servers, after the call is connected, may require that the user press "3" to begin playback of new messages. In other examples, the user may need to navigate to a received message using the number keys, then press 3 (or another number) to begin message playback.

The call to the voicemail server is active and the user can listen to the call, i.e. listen to the audio stream that is received during the call, and respond accordingly using the number keys. Additionally, the interface provides a Record button 304 and Stop 306 button to start and stop recording of the audio stream. In this manner, the user can initiate recording of the audio stream by pressing Record button 304, for instance just before playback of the voicemail commences, and initiate halting of that recording by pressing Stop button 306, just after playback of the voicemail ends. The recorded audio stream can be saved, for instance by the application at the client device. Additionally or alternatively, as described in further detail below, the application can regard the user input to start/stop recording as initiation for a remote device, such as an intermediary device sitting between the client application and the voicemail server, to start and stop recording the audio stream, for instance in cases where the audio stream passes through the intermediary device en route to the client computing system and the intermediary device includes functionality to recorded the audio stream.

After the portion of the audio stream is recorded, a Confirm & Save screen can be presented which enables the user to playback the recorded portion. Additionally, the screen can provide buttons for saving the recorded portion to the user's account, or for canceling without saving the recorded portion. If the user chooses to save to the user's account, the recorded portion, or an isolated part of that recorded portion representing the voicemail message, is uploaded to the remote backup server and backed up. In this regard, the recorded portion may include not only the voicemail message but additional portions of the audio stream before and/or after the voicemail message in the stream. Before or after the voicemail message in the recorded portion is backed up, the voicemail message can be isolated from the rest of the recorded portion using any number of techniques. For instance, the user can manually indicate a start and stop of the voicemail message in the recorded portion. Additionally or alternatively, this editing can be automated by analyzing properties of the recorded portion of the audio stream, for instance by detecting changes in audible signals of the audio stream. For instance, periods of relative silence or low audible signal can indicate that a voicemail is about to begin or has just ended. Other techniques may analyze the waveform of the recorded portion to identify where the voicemail begins and ends.

When the user saves the voicemail message, the application may take the user to a My Messages screen (which is also accessed from the Command Screen 200 of FIG. 2 by selecting My Messages button 204). The My Messages screen, which may be implemented as several sub-screens, presents a list of backed up messages for each registered phone number of the user. In one example, the messages are arranged in folders, for instance one folder (or root of a separate folder tree) for each registered phone number. For each registered phone number, the number is indicated along with a list of backed up messages optionally arranged by an identifier, such as a sender of the message. In this regard, aspects described herein enable automatic and/or manual message tagging which associates tag(s) with backed up messages to, for instance, assist in organizing and searching for backed up messages. Messages can be tagged using information provided by the telecommunications service provider with the message, or other identifying information associated with the message, such as a phone number from with the message was received. Identifying information can include a person sending or leaving the message, time, date of the arrival, etc. In some embodiments, this tagging is automatic. In some embodiments, manual tagging is enabled, for instance if, due to limitations of the mobile device or carrier, the identifying information is not inherently meaningful or ascertainable. In one embodiment, the user manually applies tags to messages either before or after they are uploaded to a remote backup server and create folders, moving messages into folders to facilitate an organized archive of the user's messages.

Thus, in the My Messages screen for a particular phone number, the messages may be arranged according to the sender of the message. For each sender, a list of backed up messages is provided. Additionally, a play button may enable the user of the application to playback the backed up message, whereby the message may be streamed or downloaded to the client computing system from the remote backup server (if not already presented on the client computing system) and played for the user.

Accordingly, folder based message management is provided. Messages can be stored and/or displayed using a folder or other nested/tree-based organization structure. For instance, a user can have a default inbox (for each phone number, in some cases) into which all messages uploaded to the remote backup server(s) are initially received. A user can create, edit, rename, delete, organize, rearrange, etc. message folders and move messages to the folders, in order to classify and organize messages. In one embodiment, the organization of messages (and interface therefore) is similar in form and functionality to common email message organization and presentation techniques. A user can delete any message that he/she no longer wishes to store at the remote backup server(s). Deleted messages can initially be place into a Trash and retained indefinitely. When deleted from Trash, the message may be permanently deleted, in one example.

A user can utilize the My Message interface of the application to access these folders and manage messages within the folders. In other examples, the user can access the messages and this My Messages hierarchy via a web interface of a data processing system, such as a personal computer (i.e. desktop, laptop) or a mobile device. In folder-based message management, the user can listen to voicemail, read texts, create folders, and put the saved messages into the folders, labeled with whatever comes from the carrier, in some examples. Whatever the carrier provides and/or the client computing system provider allows to be read on the client device can be used to tag the message, in which a label associated with the message may be automatically applied, and in one example applied based on predefined rules.

Text and voice messages that are provided to a remote backup server can be stored and be made accessible to a user as described above, for instance by way of an application on a mobile device from which messages were uploaded, or from a PC or other computing system via Web services. A user's message area can be password protected, requiring login to the user's account. In one embodiment, as described above, the user signs up for an account by choosing an account name and password, and can authenticate himself/herself to access his/her account via a web-based interface that displays/provides a user interface by which the user can view, sort, categorize, label, read, play, edit, delete, etc. the messages stored on the remote server. The user interface can allow a user to change his/her account information, including a password, as often as the user wants.

It is also contemplated that, in addition to message backup facilities, message manipulation, editing, creation, and sharing facilities can be provided. Thus, creation and/or addition of voice/music or other audio messages to saved messages is provided so that saved messages can be edited and/or enhanced. Additionally, messages and created/uploaded audio, including enhanced messages, can be sent/forwarded/shared with other users. A notification or other messaging system can be provided that enables users to share messages or portions thereof with other users, for example through one or more of a variety of methods including playing the message audio file in the context of an active telephone call to another recipient of the message being played/shared. In one example, the another recipient is a user, though it is understood that the another recipient may be another entity or component receiving the message to then be provided to the other user, such as the other user's mobile device, or a voicemail box for that other user. A social platform can therefore be established to enable social interaction which includes message tagging, editing, sharing, etc. with others, including users of the backup service, and non-users of the backup service.

For instance, selection of a Share a Message button (206, FIG. 2) of the application can present a Share a Voice Message screen with guidance on how to share a message: First, the user may select a message to share using an interface similar to or the same as the My Messages interface described above. Next, the user can select recipients of the message to whom the message is to be shared. Then, the user can optionally type/record an introduction to the voice message, to enhance the voice message with additional content, and confirm that the enhanced message is to be shared.

A Share button can be associated with each of the saved messages. In one example, the Share button is placed next to the Play button to playback the saved message as described above. Selecting the share button for a particular message displays an interface where the user can indicate (input, using a display numerical keypad, for instance, or selecting from a list of Contacts) one or more recipients to which the message is to be shared. The recipients can be indicated as telephone numbers, in one example. Additionally or alternatively, a maximum can be placed on the number of recipients of a shared message, and incremental fees may be charged to the user based on the numbers of individual recipients for the shared message, for instance.

After the user selects the recipients to which the message is to be shared, the user can be presented with an interface for enhancing the message, for instance with additional audio. In one example, a recorder interface is provided that enables the user to record an audio message that is to be appended before, after, or embedded within, the message being shared. In one example, the duration of the audio message is limited, which may also be dictated based on subscription level. In other examples, the user instead enhances the message with prerecorded or other predefined content, such as a song, jingle, or any other audio message. The predefined content may be content that is stored on the computing system or elsewhere. In some examples, the user may select additional audio content for which an additional fee applies, such as a song dedication if a user selects music to add to a message. In this manner, a database of audio files may be maintained and/or provided for selection of one or more audio files by a user, where the selection may result in an additional fee, to use that audio file, charged to the user. In some examples, the user is required to select an audio message with which the message being shared is to be enhanced. For instance, the user may be required to select an audio message from a set of advertisement audio messages. The set of advertisements may be pre-selected based on information mined from the message being shared, or based on information about the user or the recipient to which the message is being shared, as examples.

Yet further, in some embodiments the backup service, rather than the user, determines a message with which to enhance the message being shared. The backup service may randomly or selectively apply advertisement audio messages to voicemail messages being shared between a user and others, for instance.

When a message is shared, in one example, the client computing system initiates a call to each of the phone numbers to which the message is being shared. When the call is answered, either by another person or by the voicemail service of the recipient phone number, the client application can play the voicemail message which may or may not be enhanced, such that the recipient phone number receives the voicemail message as part of the audio stream of the call being placed.

In another example of sharing a message, the message is shared by way of email or some other content-exchange facility suitable for exchanging the message being shared. For instance, the message may be provided as a formatted file (such as an .mp3, .wav, etc.) attached to an email, posted to a friend's social network page, etc.

Additional scenarios for backing up voice and text messages are now provided by way of example only. In the first example, a client computing system is in communication with a cloud backup server at a first remote location, and a voicemail server at a second remote location, such as a telecommunications service operator's location. The client is a mobile telephone, PC, or tablet, running client software ('agent').

The client detects that there is a message that is to be backed up. Depending upon the client device type, this can be done either by reading a message notification on the device or by manual methods, as examples. When a message for backup is detected, the client either automatically or under user direction dials a preconfigured access number for the voicemail server. The client may have been pre-configured with such information (e.g. a voicemail access number, and PIN), for instance during account setup or upon a user logging into his/her account using the application.

After establishing the connection with the voicemail server by way of a call, the agent automatically sends the required authentication information for the account verification to the voicemail server. The agent then enters the numerical digit(s) required to play the first message in the voicemail storage. This information can be pre-configured or can be manually entered after a prompt is heard from the voicemail server.

The agent automatically (in one example) starts recording the audio stream being received as soon as a connection is made with the voicemail server, in this example. At the end of the message, a user disconnects the call or can play the next message for possible recording thereof.

Next, a manual or automatic voice editing algorithm is used to isolate the voice message(s) from surrounding audio (system prompt, other messages, etc.) that may have been recorded in the audio stream. In both scenarios, the recorded message may have system prompt as well as real voice message. For instance, in a manual separation mode, a user may be presented with options to (i) play the recording, (ii) indicate a starting message marker for the voicemail message, and/or (iii) indicate an ending message marker for the voicemail message. The user can playback and listen to the message and identify, using the start indicator, the start of a voice message. This helps in separating the audio before the playback of the voicemail message from the message content itself. In some examples, the ending of the voicemail message is also indicated by the user, though in other examples, the ending of the voicemail message is automatically identified using a property of the recorded audio, for instance by analyzing for silence or near-silence in the recorded portion of the audio stream, or analyzing for other audible properties of the recorded portion of the audio stream.

In contrast to the manual separation mode, an automatic separate mode is provided which uses properties of the recorded portion of the audio stream to identify the start and/or end of a message. A system prompt is typically followed by the actual message, so analyzing the recorded portion for the system prompt can indicate the start of the message in the waveform. The recorded portion can be analyzed for audio levels to identify a segment of silence (or near-silence below a threshold audio level) of about 2 seconds (or other set duration of time). When the silence (or near-silence) is detected, that may be deemed to be the end of the prompt and the start of the voice message. The duration of the detected silence or near-silence is, in one example, a user or administrator-configurable system parameter so that the detection can be tailored to the particular systems with which it is used.

Continuing with the example from above, once the voice message is separated from the extraneous recorded audio, a user may be able to add classification tag(s) to the voice message (personal, business, family, other, etc.) as described previously. In some examples, a user associates a set of keyword tags for the message which allows the voice message to be searched-for and identified using the keyword tags attached to it.

The client logs in (if not already) to the cloud backup server utilizing the user's ID, password, and/or other authentication Information. The client then uploads the voice message to the cloud server which stores and associates the voice message with the user's account, in which a unique message Id is generated and the voice message is saved in a database.

In another scenario, an intermediate call proxy node (such as a VoIP PBX switch) is used to perform some of the above-described aspects, such as placement of a call to the voicemail server. In this scenario, a client computing system is in communication with a cloud backup server at a first remote location, and a voicemail server at a second remote location by way of the intermediary switch. The client is again a mobile telephone, PC, or tablet, running client software (agent). The client initiates establishment of an active telephone call by communicating with the intermediary switch to place the telephone call to the voicemail server. The intermediary switch establishes the active telephone call between the client and the voicemail server, and the client records the portion of the audio stream as described previously.

In yet another scenario, an intermediate call proxy node (such as a VoIP PBX switch) is used to perform some of the above-described aspects, such as the recording of the message. This approach may be used in situations where the client device does not have call recording capabilities or is otherwise restricted from performing some of the functionality described above. In this scenario, a client computing system is in communication with a cloud backup server at a first remote location, and a voicemail server at a second remote location by way of the intermediary node. The client is again a mobile telephone, PC, or tablet, running client software (agent). Certain functionality of the intermediary node can be controlled by the agent executing on the client.

The client initiates a call to the voicemail server via the intermediate node. The intermediate node in turns forwards the call to the voicemail server. Once the call is connected, the client initiates recording of the audio stream by requesting that the intermediate node begin recording the audio stream (the audio passes through the intermediary node en route to the client). Additionally, the client requests the voicemail server (e.g. by way of DTMF signaling passed through the intermediary node to the voicemail server) to begin playing the voice message. The intermediary node, meanwhile, is recording the audio stream between the voicemail server and the client. At some point, such as based on the client indicating that recording is to halt, or upon termination of the call, recording stops.

The recorded portion of the audio stream, which includes the voicemail message to be saved, is then made available for the client to download. It may optionally be uploaded to the cloud server by the intermediary node and/or by the client.

Voicemail message isolation can then be performed as described previously, and the isolated voicemail message can replace the recorded portion stored on the cloud server (if present). Additionally, the client can add meta tag(s) and message classifier(s), as above, and perform message organization as described previously.

Regarding backup of text messages from the client device, the text messages, on the client, along with additional information such as a text message source (phone number), time (including date) of arrival, etc. can be periodically uploaded to and stored by the cloud server. In one example, to prevent redundant backup of a message, the cloud server can use a triplet of sender phone number, date, and time markers to recognize duplicate messages and removes copies of the message.

Figure 4:
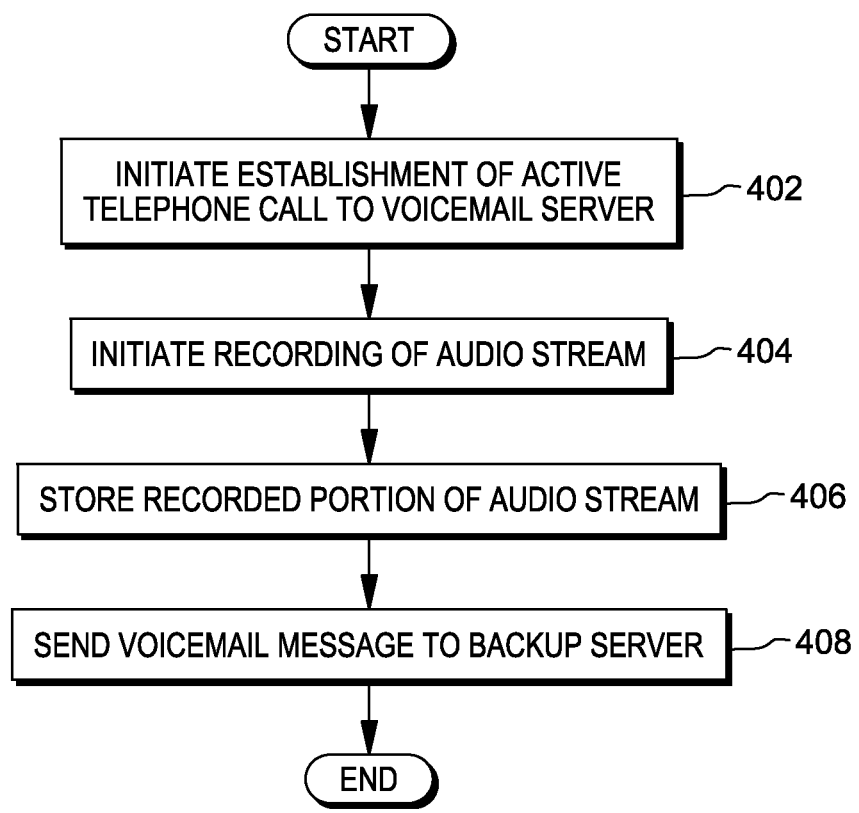
FIG. 4 depicts one example of a process for backing up a message, in accordance with aspects described herein.

Described herein are facilities for backing up messages, including voicemail messages and text messages received at destination telephone phone numbers. Accordingly, FIG. 4 depicts one example of a process for backing up a message, in accordance with aspects described herein. In one example, the process of FIG. 4 is performed by program code executing on a client computing system, such as a mobile device. The process begins by initiating establishment of an active telephone call to a voicemail server of a telecommunications service (402). The voicemail server stores one or more voicemails. In one example, this initiating includes invoking a telephone calling facility of the client computing system to place the active telephone call, and the active telephone call is thereby established between the voicemail server and the telephone calling facility of the client. In another example, the initiating includes communicating with an intermediary system, such as a VoIP switch, to place the telephone call to the voicemail server, in which case the intermediary system establishes the active telephone call between the voicemail server and the client, and an audio stream of the active telephone call may pass through the intermediary system.

Continuing with FIG. 4, the process then initiates recording of the audio stream of the active telephone call (404), which audio stream includes the voicemail message stored at the voicemail server. For instance, the stored voicemail message is played back as part of the audio stream of the active telephone call between the client and the voicemail server.

In one embodiment, recording is initiated and performed by the agent of the client. The agent may receive the audio stream and record a portion of the received audio stream, which portion includes the voicemail message being played back. In this manner, the portion of the audio stream may be recorded by the client.

In another embodiment, recording is initiated by the client requesting that an intermediary system (though which the audio stream passes) begin recording the audio stream of the active telephone call. For instance, the agent on the client communicates to the intermediary system that recording is to begin. Additionally, the client may request that the voicemail server begin playing the voicemail message (such as by receiving user input to begin playback). The intermediary system may forward the request to the voicemail server, e.g. in the form of a DTMF signal.

In either case—where the client records the portion of the audio stream or the intermediary system records the portion of the audio stream based on client direction to do so—the initiating recording is performed by the client, and the starting and stopping of the recording may be automatic, or based on user input. For instance, user input to a Start or Record button presented in an interface of the client can indicate that recording of the audio stream is to begin. If recording is being performed at the client, the client begins recording. If recording is being performed at the intermediary system, the client can send an indication to the intermediary system that recording is to begin. Similarly, user input, such as to a Stop button presented in the interface of the client, can indicate that recording of the audio stream is to halt, in which case the indication is passed to the intermediary system, if recording is occurring at the intermediary system.

Next, at least a portion of the recorded audio stream is stored (406). When recording occurs at the client, the stream is stored by the client as it is recorded. When recording occurs at the intermediary node, the client can download from the intermediary node the portion of the recorded stream and store the downloaded portion.

The voicemail message is then sent to a remote backup server for backup of the voicemail message (408). In this regard, the recorded portion of the audio stream may be edited at some point to isolate the voicemail message. For instance, content that is before the voicemail message, after the voicemail message, or both before and after the voicemail message in the audio stream is removed. The editing can occur at any point after the portion is recorded, and at any one or more components that at least temporarily stores the portion. For instance, the portion could be edited at an intermediary system if it is recorded at the intermediary system, and before being downloaded to the client. Alternatively, the portion could be edited at the client after the client downloads the portion or in situations where the portion is recorded by the client itself. Yet alternatively, the portion could be uploaded to the remote backup server and edited after being uploaded to the remote backup server.

In any case, editing of the portion, for instance to isolate the voicemail message from the recorded portion, is automatic, in some examples, or manual, in some examples. The portion can be automatically edited, in which a beginning and an ending of the voicemail message is automatically determined based on at least one property of the audio stream, to automatically isolate the voicemail message. The at least one property could include silence or near-silence detected in the waveform. Other techniques for analyzing the properties of the audio stream and isolating a desired segment, such as a voicemail message therein, are possible.

Additionally or alternatively, the portion can be manually edited, in which a user indicates a start of the voicemail message and an end of the voicemail message, perhaps by commencing playback of the recorded portion of the audio stream and indicating the start and stop as the message is played back.

In some examples, a hybrid approach is taken to editing the portion to isolate the voicemail, wherein a beginning and/or ending of the voicemail message are determined automatically, subject to user verification and/or adjustment.

It is noted that the client may be involved in the editing of the portion of recorded audio stream, even if the changes to the portion (to remove pre-pended or post-pended audio) are committed at a different device. As an example, the editing may be at least partially performed by the client, even when the portion is stored at the intermediary system or a remote backup server. In this scenario, indications can be sent from the client indicating how the stored portion is to be edited. In this manner, the client is at least partially involved in the editing of the recorded content to isolate the voicemail message therefrom.

In another aspect described herein, a voicemail message is tagged with identifying information about the voicemail message, such as a sender name, phone number, timestamps, etc, or keywords that a user applies to the message. This tagging can occur automatically, manually, or a combination of the two, can occur at any point after the voicemail has been recorded, and at any one or more components that at least temporarily stores the voicemail message (either before or after it is isolated from the portion of the recorded audio stream). In some embodiments, the tags are used for message organization purposes, as described above, such as when multiple messages are backed up and organized in a folder or similar organization structure.

In yet a further aspect described herein, the voicemail message can be enhanced by combining the voicemail message with additional content, such as text-based descriptive content, or separate audio message(s). This enhancement can occur automatically, manually, or a combination of the two, can occur at any point after the voicemail has been record, and at any one or more components that at least temporarily stores the voicemail message (either before or after it is isolated from the portion of the recorded audio stream). The separate content with which the voicemail message is enhanced could be, for instance, another audio message that is separately recorded by the user, or could be a song or other audio clip, for instance a song stored in the user's music collection on the client computing system or a song that is purchased, either from another entity through a service described herein or by using an external service. In another example, the separate content is advertising content, such as an audio advertisement that is combined with the voicemail message such that when the voicemail message is played for the user and/or another entity to which the user shares the voicemail message, the audio advertisement is played before, after, and/or during playback of the voicemail message. In this regard, targeted advertising may be provided wherein voicemail messages are enhanced with advertisements potentially related to the voicemail message itself, and/or the user to whom the voicemail message was sent.

Sharing of the voicemail message can be initiated by the user utilizing the client computing system. In one example, the user shares a saved voicemail message with a recipient. The recipient may or not be another user of a backup service described herein. Sharing of a voicemail message can include playing the voicemail message back via the client computing system (e.g. a mobile device) for the recipient during an active telephone call with the recipient. For instance, the user can indicate that the voicemail message is to be shared with a person having a particular phone number, in which case the client application can initiate a call to the particular phone number and commence playback of the message to be shared (which may be enhanced with additional content as described above) such that the recipient hears the message, or the recipient's voicemail box records the message being played back.

In another example of sharing the voicemail message with another recipient, if the another recipient has an account with a backup service as described herein, the voicemail message (which may or may not be enhanced) may become additionally associated with the another recipient's account, enabling the another recipient to playback the shared message as if it were a message that the recipient itself received and saved to his/her account.

In further embodiments, voice and/or text messages that are pushed to the client computing system can additionally be sent to the remote backup server and organized along with the voicemail message(s) that are recorded according to aspects described herein.

Figure 5:
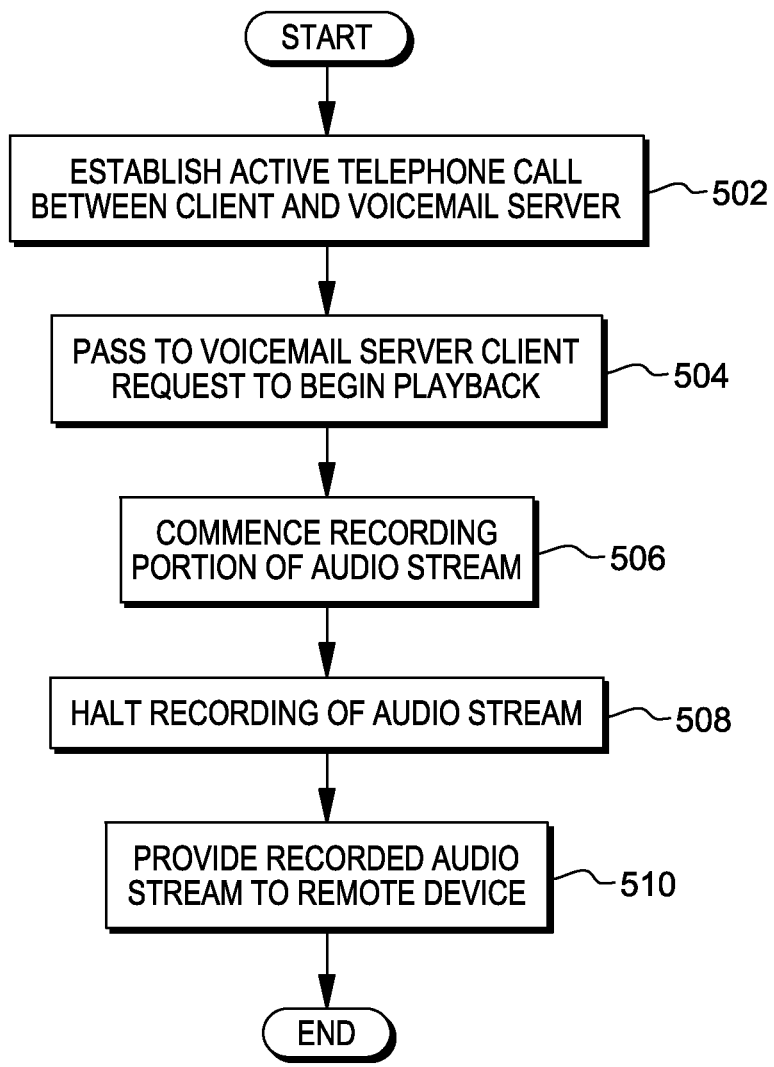
FIG. 5 depicts one example of a process for facilitating backing up of a message, in accordance with aspects described herein.

The process of FIG. 4 focuses on actions performed at a client computing device. FIG. 5 depicts one example of a process for facilitating backing up a message, in accordance with aspects described herein, and, in one embodiment, the process is performed by an intermediary system as described herein. The intermediary system may be a separate component from both the client computing system and the voicemail server. In some embodiments, the intermediary system comprises the remote backup server(s) to which the messages are backed up.

The process begins by establishing an active telephone call between a client computing system and a voicemail server storing a voicemail message (502). An audio stream of the active telephone call passes though the intermediary system and includes a voicemail message to be backed up. In one example, the establishment of this telephone call is based on a request from a client computing system to establish the telephone call. The request may come from a VoIP dialer of the client computing system, for instance.

Next, a request from the client computing system to begin playback of the voicemail message is passed to the voicemail server (504). In this example, the client computing system communicates to the voicemail server through the intermediary system, and as part of that communication makes a request (such as input of the number 3, as an example) that playback commence.

The process continues by commencing recording of at least a portion of the audio stream (506). The portion includes the voicemail message desired to be backed up. The recording by the intermediary system is commenced, in one example, based on receiving an indication from the client computing system that recording is to be commenced. For instance, a user monitoring the active telephone call pushes a button on the client interface to indicate for the intermediary system that recording is to commence.

Next, recording of the audio stream is halted (508). Again, in one example, halting the recording is based on receiving an indication from the client computing system that recording is to be halted.

In alternative embodiments, recording is automatically commenced and halted based on at least one property of the audio stream, such as one or more audio properties that can be analyzed automatically to make a determination that a voicemail message is beginning or ending.

Then, the recorded audio stream is provided to a remote device (510). The remote device could be the client computing system, a remote backup server, or could be both systems.

Additionally, as described above, further processing of the recorded portion of the audio stream can be performed at the intermediary system. For instance, the recorded portion of the audio stream could be enhanced, edited, and/or tagged, as examples, which could be performed to the recorded portion stored at the intermediary system, before the intermediary system provides the recorded portion to the remote device.

Aspects described herein enable backup, editing, tagging, organization, and sharing of voicemail and text messages that a user receives at one or more telecommunications services provided to the user, such as one or more phone accounts (work mobile, personal mobile, office, home, etc.). A user establishes an account with a backup service and can associate multiple numbers with the account. For instance, multiple mobile devices having different phone numbers can each have a client mobile application installed thereon to upload to the user's account messages received at those mobile devices. In this regard, a single user account can accommodate multiple different mobile, home, office, etc. phone numbers in order to aggregate messages across the multiple numbers with the single account.

Additionally, the messages are backed up indefinitely, apart from the user's telecommunications service(s) or the devices used with those service(s). Later storage/retrieval of the saved messages is completely independent of whether the user has access to his/her mobile device (lost, stolen, breaks, cell service suspended, etc). Furthermore, deletion of messages from the mobile device and/or voicemail server(s) does not affect retention of the backed up versions that are stored at the remote backup servers. Provided, therefore, are facilities for persistent backup of all voice and text messages, received at various numbers, through a central service disjoint from the users' telecommunication services through which the messages were received.

Accordingly, described above is a feature-rich message backup and sharing system and service in which not only is message backup and data protection provided for voice and text messages, but also message tagging, editing, organization, enhancement (including addition of message content such as additional voice or sound content), and/or sharing is further provided as part of a social platform in which users can modify and share messages with others.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 6:
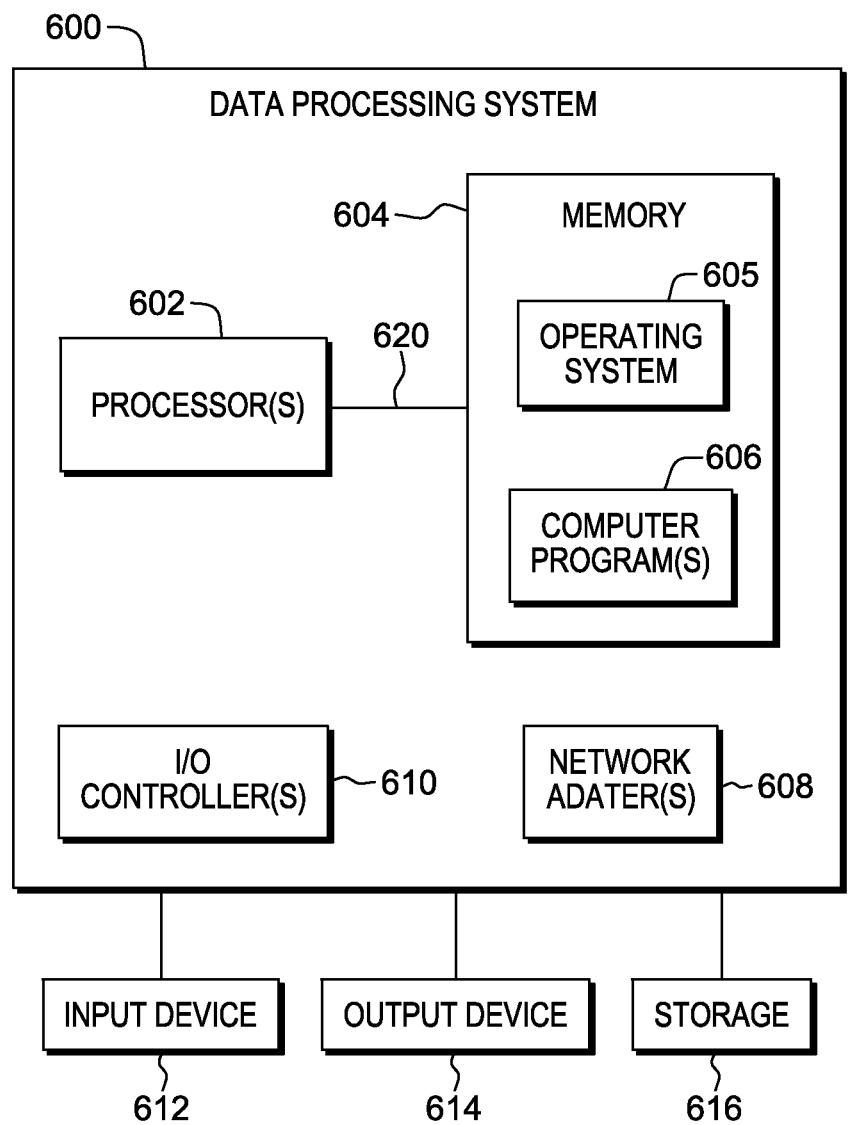
FIG. 6 depicts one example of a data processing system to incorporate and use one or more aspects of the present invention.

FIG. 6 depicts one example of a data processing system to incorporate and use one or more aspects of the present invention. Data processing system 600 is suitable for storing and/or executing program code, such as program code for performing processes described above, and includes at least one processor 602 coupled directly or indirectly to memory 604 through, a bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606. In one example, system 600 is a mobile device and a program 606 is a client app for performing the process of FIG. 4 for backing up a message. In other examples, system 600 is a remote backup server, or an intermediary system, as described above.

Input/Output (I/O) devices 612, 614 (including but not limited to keyboards, displays, pointing devices, etc.) may be coupled to the system either directly or through I/O controllers 610.

Network adapters 608 may also be coupled to the system to enable the data processing system to become coupled to other data processing systems through intervening private or public networks. Modems, cable modem and Ethernet cards are just a few of the currently available types of network adapters 608. In one example, network adapters 608 facilitate sending messages to and/or receiving messages from remote sources to facilitate aspects of the present invention.

Data processing system 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602.

The data processing system 600 may include fewer components than illustrated, additional components not illustrated herein, or some combination of the components illustrated and additional components. Data processing system 600 may include any computing device known in the art, such as a mainframe, server, personal computer, workstation, laptop, handheld computer, telephony device, network appliance, virtualization device, storage controller, etc.

In addition, processes described above may be performed by multiple data processing systems 600, working as part of a clustered computing environment.

In some embodiments, aspects of the present invention may take the form of a computer program product embodied in one or more computer readable medium(s). Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
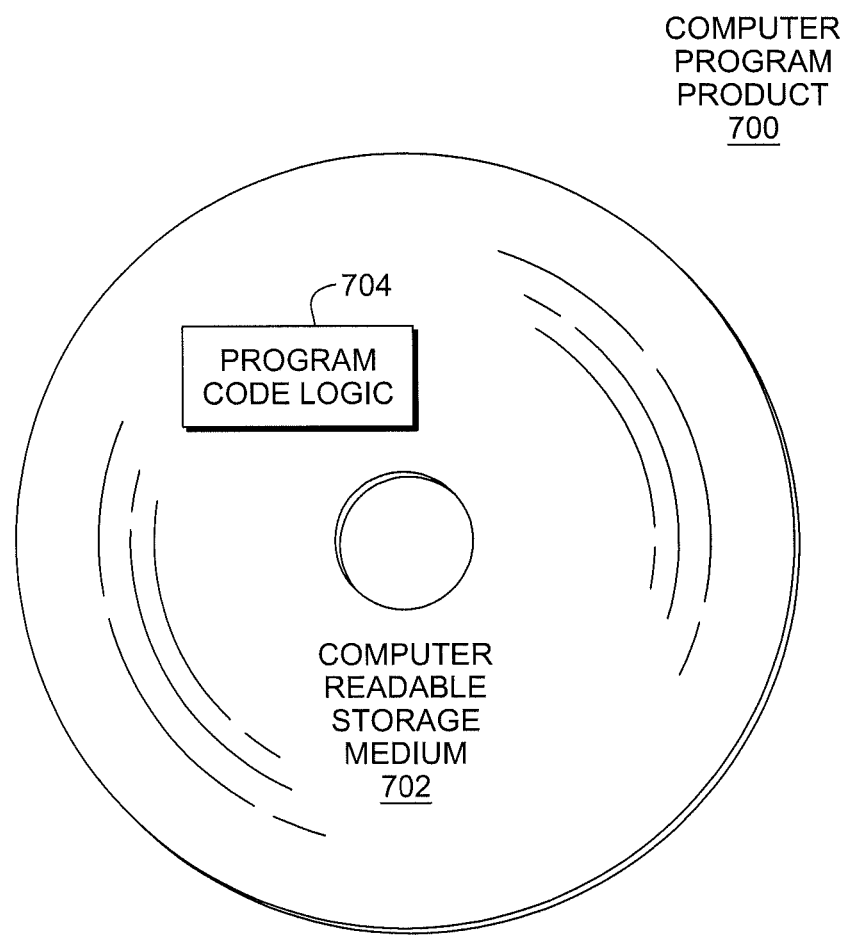
FIG. 7 depicts one embodiment of a computer program product incorporating one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

A small sample of systems, methods, and computer program products that are described herein is as follows:

A1. A method for backing up one or more messages, the method comprising:
   initiating, by a processor of a computing system, establishment of an active telephone call to a voicemail server of a telecommunications service, the voicemail server storing a voicemail message;
   initiating recording of at least a portion of an audio stream of the active telephone call, the portion of the audio stream comprising the voicemail message;
   storing the recorded portion of the audio stream, wherein the stored portion of the audio stream comprises the voicemail message; and
   sending the voicemail message to a remote backup server for backup of the voicemail message.

A2. The method of A1, wherein initiating establishment of the active telephone call comprises invoking a telephone calling facility of the computing system to place the active telephone call, wherein the active telephone call is established between the telephone calling facility of the computing system and the voicemail server.

A3. The method of A2, wherein the computing system initiates the recording of the portion of the audio stream, and wherein the computing system receives the audio stream during the active telephone call and records the portion of the audio stream as it is received.

A4. The method of A1, wherein initiating establishment of the active telephone call comprises communicating with an intermediary system to place the telephone call to the voicemail server, wherein the intermediary system establishes the active telephone call between the computing system and the voicemail server, and wherein the audio stream of the active telephone call passes through the intermediary system.

A5. The method of A4, wherein the intermediary system comprises a voice over Internet Protocol switch.

A6. The method of A4, wherein initiating recording of the portion of the audio stream of the active telephone call comprises:
   the computing system requesting that the intermediary system begin recording the portion of the audio stream of the active telephone call; and
   the computing system requesting that the voicemail server begin playing the voicemail message as part of the audio stream of the active telephone call.

A7. The method of A6, wherein the computing system downloads the recorded portion of the audio stream from the intermediary system, and stores the recorded portion of the audio stream.

A8. The method of A1, wherein the recording is started and stopped based on user input, wherein user input indicating that recording is to begin initiates recording of the portion of the audio stream, and wherein user input indicating that recording is to halt initiates halting the recording of the portion of the audio stream.

A9. The method of A1, wherein the method further comprises editing the recorded portion of the audio stream, the editing isolating the voicemail message from recorded content that is at least one of before or after the voicemail message in the audio of the recorded portion of the audio stream.

A10. The method of A9, wherein the recorded portion of the audio stream is edited automatically, wherein a beginning and an ending of the voicemail message is automatically determined based on at least one property of the audio stream, and wherein the voicemail message is automatically isolated based on the determining.

A11. The method of A9, wherein the recorded portion of the audio stream is edited manually, wherein a user commences playback of the recorded portion of the audio stream and indicates a start of the voicemail message and an end of the voicemail message.

A12. The method of A1, wherein the method further comprises tagging the voicemail message with identifying information about the voicemail message.

A13. The method of A1, wherein the computing system is a mobile device.

A14. The method of A1, wherein the method further comprises enhancing the voicemail message by combining the voicemail message with a separate audio message.

A15. The method of A14, wherein the separate audio message comprises at least one of: another audio message separately recorded by the user, an audio advertisement, or a song.

A16. The method of A1, wherein the method further comprises initiating sharing the voicemail message with another recipient.

A17. The method of A16, wherein the sharing comprises playing back the voicemail message via the computing system for the another recipient during an active telephone call with the another recipient.

A18. The method of A1, wherein the voicemail message is one of a plurality of voicemail messages stored at the remote backup server, and wherein the method further comprises providing an interface for organizing the plurality of voicemail messages into one or more folders.

A19. The method of A1, wherein the method further comprises automatically receiving an additional voicemail message, the additional voicemail messaged pushed to the mobile device, and sending the additional voicemail message to the remote backup server.

A20. The method of A1, wherein the method further comprises uploading one or more text messages stored on the computing system to the remote backup server along with an indication of a source and time of arrival of each text message of the one or more text messages.

B1. A computing system for backing up one or more messages, the computing system comprising:
 a memory; and
 a processor in communication with the memory, wherein the computing system is configured to perform a method comprising:
  initiating establishment of an active telephone call to a voicemail server of a telecommunications service, the voicemail server storing a voicemail message;
  initiating recording of at least a portion of an audio stream of the active telephone call, the portion of the audio stream comprising the voicemail message;
  storing the recorded portion of the audio stream, wherein the stored portion of the audio stream comprises the voicemail message; and
  sending the voicemail message to a remote backup server for backup of the voicemail message.

B2. The computing system of B1, wherein initiating establishment of the active telephone call comprises invoking a telephone calling facility of the computing system to place the active telephone call, and wherein the active telephone call is established between the telephone calling facility of the computing system and the voicemail server.

B3. The computing system of B2, wherein the computing system initiates the recording of the portion of the audio stream, and wherein the computing system receives the audio stream during the active telephone call and records the portion of the audio stream as it is received.

B4. The computing system of B1, wherein initiating establishment of the active telephone call comprises communicating with an intermediary system to place the telephone call to the voicemail server, wherein the intermediary system establishes the active telephone call between the computing system and the voicemail server, and wherein the audio stream of the active telephone call passes through the intermediary system.

B5. The computing system of B4, wherein the intermediary system comprises a voice over Internet Protocol switch.

B6. The computing system of B4, wherein initiating recording of the portion of the audio stream of the active telephone call comprises:
 the computing system requesting that the intermediary system begin recording the portion of the audio stream of the active telephone call; and
 the computing system requesting that the voicemail server begin playing the voicemail message as part of the audio stream of the active telephone call.

B7. The computing system of B6, wherein the computing system downloads the recorded portion of the audio stream from the intermediary system, and stores the recorded portion of the audio stream.

B8. The computing system of B1, wherein the recording is started and stopped based on user input, wherein user input indicating that recording is to begin initiates recording of the portion of the audio stream, and wherein user input indicating that recording is to halt initiates halting the recording of the portion of the audio stream.

B9. The computing system of B1, wherein the method further comprises editing the recorded portion of the audio stream, the editing isolating the voicemail message from recorded content that is at least one of before or after the voicemail message in the audio of the recorded portion of the audio stream.

B10. The computing system of B9, wherein the recorded portion of the audio stream is edited automatically, wherein a beginning and an ending of the voicemail message is automatically determined based on at least one property of the audio stream, and wherein the voicemail message is automatically isolated based on the determining.

B11. The computing system of B9, wherein the recorded portion of the audio stream is edited manually, wherein a user commences playback of the recorded portion of the audio stream and indicates a start of the voicemail message and an end of the voicemail message.

B12. The computing system of B1, wherein the method further comprises tagging the voicemail message with identifying information about the voicemail message.

B13. The computing system of B1, wherein the computing system is a mobile device.

B14. The computing system of B1, wherein the method further comprises enhancing the voicemail message by combining the voicemail message with a separate audio message.

B15. The computing system of B14, wherein the separate audio message comprises at least one of: another audio message separately recorded by the user, an audio advertisement, or a song.

B16. The computing system of B1, wherein the method further comprises initiating sharing the voicemail message with another recipient.

B17. The computing system of B16, wherein the sharing comprises playing back the voicemail message via the computing system for the another recipient during an active telephone call with the another recipient.

B18. The computing system of B1, wherein the voicemail message is one of a plurality of voicemail messages stored at the remote backup server, and wherein the method further comprises providing an interface for organizing the plurality of voicemail messages into one or more folders.

B19. The computing system of B1, wherein the method further comprises automatically receiving an additional voicemail message, the additional voicemail messaged pushed to the mobile device, and sending the additional voicemail message to the remote backup server.

B20. The computing system of B1, wherein the method further comprises uploading one or more text messages stored on the computing system to the remote backup server along with an indication of a source and time of arrival of each text message of the one or more text messages.

C1. A computer program product for backing up one or more messages, the computer program product comprising:
 a tangible storage medium storing program instructions readable by a processor of a computing system for execution to perform a method comprising:
  initiating, by the processor of the computing system, establishment of an active telephone call to a voicemail server of a telecommunications service, the voicemail server storing a voicemail message;
  initiating recording of at least a portion of an audio stream of the active telephone call, the portion of the audio stream comprising the voicemail message;
  storing the recorded portion of the audio stream, wherein the stored portion of the audio stream comprises the voicemail message; and
  sending the voicemail message to a remote backup server for backup of the voicemail message.

C2. The computer program product of C1, wherein initiating establishment of the active telephone call comprises invoking a telephone calling facility of the computing system to place the active telephone call, and wherein the active telephone call is established between the telephone calling facility of the computing system and the voicemail server.

C3. The computer program product of C2, wherein the computing system initiates the recording of the portion of the audio stream, and wherein the computing system receives the audio stream during the active telephone call and records the portion of the audio stream as it is received.

C4. The computer program product of C1, wherein initiating establishment of the active telephone call comprises communicating with an intermediary system to place the telephone call to the voicemail server, wherein the intermediary system establishes the active telephone call between the computing system and the voicemail server, and wherein the audio stream of the active telephone call passes through the intermediary system.

C5. The computer program product of C4, wherein the intermediary system comprises a voice over Internet Protocol switch.

C6. The computer program product of C4, wherein initiating recording of the portion of the audio stream of the active telephone call comprises:
 requesting that the intermediary system begin recording the portion of the audio stream of the active telephone call; and
 requesting that the voicemail server begin playing the voicemail message as part of the audio stream of the active telephone call.

C7. The computer program product of C6, wherein the computing system downloads the recorded portion of the audio stream from the intermediary system, and stores the recorded portion of the audio stream.

C8. The computer program product of C1, wherein the recording is started and stopped based on user input, wherein user input indicating that recording is to begin initiates recording of the portion of the audio stream, and wherein user input indicating that recording is to halt initiates halting the recording of the portion of the audio stream.

C9. The computer program product of C1, wherein the method further comprises editing the recorded portion of the audio stream, the editing isolating the voicemail message from recorded content that is at least one of before or after the voicemail message in the audio of the recorded portion of the audio stream.

C10. The computer program product of C9, wherein the recorded portion of the audio stream is edited automatically, wherein a beginning and an ending of the voicemail message is automatically determined based on at least one property of the audio stream, and wherein the voicemail message is automatically isolated based on the determining.

C11. The computer program product of C9, wherein the recorded portion of the audio stream is edited manually, wherein a user commences playback of the recorded portion of the audio stream and indicates a start of the voicemail message and an end of the voicemail message.

C12. The computer program product of C1, wherein the method further comprises tagging the voicemail message with identifying information about the voicemail message.

C13. The computer program product of C1, wherein the computing system is a mobile device.

C14. The computer program product of C1, wherein the method further comprises enhancing the voicemail message by combining the voicemail message with a separate audio message.

C15. The computer program product of C14, wherein the separate audio message comprises at least one of: another audio message separately recorded by the user, an audio advertisement, or a song.

C16. The computer program product of C1, wherein the method further comprises initiating sharing the voicemail message with another recipient.

C17. The computer program product of C16, wherein the sharing comprises playing back the voicemail message via the computing system for the another recipient during an active telephone call with the another recipient.

C18. The computer program product of C1, wherein the voicemail message is one of a plurality of voicemail messages stored at the remote backup server, and wherein the method further comprises providing an interface for organizing the plurality of voicemail messages into one or more folders.

C19. The computer program product of C1, wherein the method further comprises automatically receiving an additional voicemail message, the additional voicemail messaged pushed to the mobile device, and sending the additional voicemail message to the remote backup server.

C20. The computer program product of C1, wherein the method further comprises uploading one or more text messages stored on the computing system to the remote backup server along with an indication of a source and time of arrival of each text message of the one or more text messages.

D1. A method to facilitate backing up one or more voicemail messages, the method comprising:
 establishing, by a processor of an intermediary system, an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message;
 passing to the voicemail server a request from the client computing system to begin playback of the voicemail message; and
 commencing recording of at least a portion of the audio stream, the portion of the audio stream comprising the voicemail message.

D2. The method of D1, wherein the recording commences based on receiving an indication from the client computing system that recording is to be commenced.

D3. The method of D2, wherein the method further comprises, based on receiving an indication from the client computing system, halting recording of the portion of the audio stream.

D4. The method of D1, wherein recording is commenced automatically based on at least one property of the audio stream.

D5. The method of D4, wherein the method further comprises halting recording of the portion of the audio stream based on the at least one property of the audio stream.

D6. The method of D1, wherein the method further comprises providing the recorded portion of the audio stream to at least one of the client computing system or a remote backup server.

D7. The method of D1, wherein the intermediary system comprises a voice over Internet Protocol switch.

E1. An intermediary system to facilitate backing up one or more voicemail messages, the intermediary system comprising:
 a processor; and
 a memory in communication with the processor, wherein the intermediary system is configured to perform a method comprising:
  establishing an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message;

passing to the voicemail server a request from the client computing system to begin playback of the voicemail message; and commencing recording of at least a portion of the audio stream, the portion of the audio stream comprising the voicemail message.

E2. The intermediary system of E1, wherein the recording commences based on receiving an indication from the client computing system that recording is to be commenced.

E3. The intermediary system of E2, wherein the method further comprises, based on receiving an indication from the client computing system, halting recording of the portion of the audio stream.

E4. The intermediary system of E2, wherein recording is commenced automatically based on at least one property of the audio stream.

E5. The intermediary system of E4, wherein the method further comprises halting recording of the portion of the audio stream based on the at least one property of the audio stream.

E6. The intermediary system of E1, wherein the method further comprises providing the recorded portion of the audio stream to at least one of the client computing system or a remote backup server.

E7. The intermediary system of E1, wherein the intermediary system comprises a voice over Internet Protocol switch.

F1. A computer program product to facilitate backing up one or more voicemail messages, the computer program product comprising:

a tangible storage medium storing program instructions readable by a processor of an intermediary system for execution to perform a method comprising:

establishing, by the processor of the intermediary system, an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message;

passing to the voicemail server a request from the client computing system to begin playback of the voicemail message; and commencing recording of at least a portion of the audio stream, the portion of the audio stream comprising the voicemail message.

F2. The computer program product of F1, wherein the recording commences based on receiving an indication from the client computing system that recording is to be commenced.

F3. The computer program product of F2, wherein the method further comprises, based on receiving an indication from the client computing system, halting recording of the portion of the audio stream.

F4. The computer program product of F1, wherein recording is commenced automatically based on at least one property of the audio stream.

F5. The computer program product of F4, wherein the method further comprises halting recording of the portion of the audio stream based on the at least one property of the audio stream.

F6. The computer program product of F1, wherein the method further comprises providing the recorded portion of the audio stream to at least one of the client computing system or a remote backup server.

F7. The computer program product of F1, wherein the intermediary system comprises a voice over Internet Protocol switch.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for backing up one or more messages, the method comprising:

initiating, by a processor of a computing system, establishment of an active telephone call to a voicemail server of a telecommunications service, the voicemail server storing a voicemail message, wherein initiating establishment of the active telephone call comprises communicating with an intermediary system to place the telephone call to the voicemail server, wherein the intermediary system establishes the active telephone call between the computing system and the voicemail server;

receiving an audio stream from the voicemail server during the active telephone call, the audio stream being part of the active telephone call, wherein the voicemail message is played back as part of the audio stream, and wherein the audio stream of the active telephone call passes through the intermediary system;

initiating recording of at least a portion of the audio stream of the active telephone call, the portion of the audio stream comprising the voicemail message, wherein the portion of the audio stream is recorded as it is being received during the active telephone call, wherein recording the portion of the audio stream records the voicemail message during playback thereof as part of the audio stream, and wherein initiating recording of the portion of the audio stream of the active telephone call comprises:

the computing system requesting that the intermediary system begin recording the portion of the audio stream of the active telephone call; and the computing system requesting that the voicemail server begin playing the voicemail message as part of the audio stream of the active telephone call, wherein the intermediary system records the portion of the audio stream during the active telephone call to record the voicemail message during playback thereof as part of the audio stream;

storing the recorded portion of the audio stream, wherein the stored recorded portion of the audio stream comprises the voicemail message; automatically isolating the voicemail message from the recorded portion of the audio stream by removing at least some content of the recorded portion of the audio stream; and sending the isolated voicemail message to a remote backup server for backup of the voicemail message.

2. The method of claim 1, wherein initiating establishment of the active telephone call comprises invoking a telephone calling facility of the computing system to place the active telephone call, wherein the active telephone call is established between the telephone calling facility of the computing system and the voicemail server.

3. The method of claim 2, wherein the computing system initiates the recording of the portion of the audio stream.

4. The method of claim 1, wherein the intermediary system comprises a voice over Internet Protocol switch.

5. The method of claim 1, wherein the computing system downloads at least some of the recorded portion of the audio stream from the intermediary system, and stores the at least some of the recorded portion of the audio stream.

6. The method of claim 1, wherein the recording is started and stopped based on user input, wherein user input indicating that recording is to begin initiates recording of the portion of the audio stream as it is being received during the active telephone call, and wherein user input indicating that recording is to halt initiates halting the recording of the portion of the audio stream.

7. The method of claim 1, wherein the at least some content comprises content that is before or after the voicemail message in the audio of the recorded portion of the audio stream.

8. The method of claim 7, further comprising determining, a beginning and an ending of the voicemail based on at least one property of the audio stream, and wherein the voicemail message is automatically isolated based on the determining.

9. The method of claim 1, further comprising editing at least some of the recorded portion of the audio stream, wherein a user commences playback of the recorded portion of the audio stream and indicates a start of the voicemail message and an end of the voicemail message.

10. The method of claim 1, wherein the method further comprises tagging the voicemail message with identifying information about the voicemail message.

11. The method of claim 1, wherein the computing system is a mobile device.

12. The method of claim 1, wherein the method further comprises enhancing the voicemail message by combining the voicemail message with a separate audio message.

13. The method of claim 12, wherein the separate audio message comprises at least one of: another audio message separately recorded by the user, an audio advertisement, or a song.

14. The method of claim 1, wherein the method further comprises initiating sharing the voicemail message with another recipient.

15. The method of claim 14, wherein the sharing comprises playing back the voicemail message via the computing system for the another recipient during an active telephone call with the another recipient.

16. The method of claim 1, wherein the voicemail message is one of a plurality of voicemail messages stored at the remote backup server, and wherein the method further comprises providing an interface for organizing the plurality of voicemail messages into one or more folders.

17. The method of claim 1, wherein the computer system is a mobile device, wherein the method further comprises automatically receiving by the mobile device an additional voicemail message, the additional voicemail pushed to, and received by, the mobile device, and sending, by the mobile device, the additional voicemail message to the remote backup server.

18. The method of claim 1, wherein the method further comprises uploading one or more cellular text messages received from senders and stored on the computing system to the remote backup server along with an indication of a sender and time of arrival of each cellular text message of the one or more cellular text messages.

19. A computing system for backing up one or more messages, the computing system comprising:

a memory; and a processor in communication with the memory, wherein the computing system is configured to perform a method comprising:

initiating establishment of an active telephone call to a voicemail server of a telecommunications service, the voicemail server storing a voicemail message, wherein initiating establishment of the active telephone call comprises communicating with an intermediary system to place the telephone call to the voicemail server, wherein the intermediary system establishes the active telephone call between the computing system and the voicemail server;

receiving an audio stream from the voicemail server during the active telephone call, the audio stream being part of the active telephone call, wherein the voicemail message is played back as part of the audio stream, and wherein the audio stream of the active telephone call passes through the intermediary system;

initiating recording of at least a portion of the audio stream of the active telephone call, the portion of the audio stream comprising the voicemail message, wherein the portion of the audio stream is recorded as it is being received during the active telephone call, wherein recording the portion of the audio stream records the voicemail message during playback thereof as part of the audio stream, and wherein initiating recording of the portion of the audio stream of the active telephone call comprises:

the computing system requesting that the intermediary system begin recording the portion of the audio stream of the active telephone call; and the computing system requesting that the voicemail server begin playing the voicemail message as part of the audio stream of the active telephone call, wherein the intermediary system records the portion of the audio stream during the active telephone call to record the voicemail message during playback thereof as part of the audio stream;

storing the recorded portion of the audio stream, wherein the stored recorded portion of the audio stream comprises the voicemail message; automatically isolating the voicemail message from the recorded portion of the audio stream by removing at least some content of the recorded portion of the audio stream; and sending the isolated voicemail message to a remote backup server for backup of the voicemail message.

20. A computer program product for backing up one or more messages, the computer program product comprising:

a tangible storage medium storing program instructions readable by a processor of a computing system for execution to perform a method comprising:

initiating, by the processor of the computing system, establishment of an active telephone call to a voicemail server of a telecommunications service, the voicemail server storing a voicemail message, wherein initiating establishment of the active telephone call comprises communicating with an intermediary system to place the telephone call to the voicemail server, wherein the intermediary system establishes the active telephone call between the computing system and the voicemail server;

receiving an audio stream from the voicemail server during the active telephone call, the audio stream being part of the active telephone call, wherein the voicemail message is played back as part of the audio stream, and wherein the audio stream of the active telephone call passes through the intermediary system;

initiating recording of at least a portion of the audio stream of the active telephone call, the portion of the audio stream comprising the voicemail message, wherein the portion of the audio stream is recorded as it is being received during the active telephone call, and wherein recording the portion of the audio stream records the voicemail message during playback thereof as part of the audio stream, and wherein initiating recording of the portion of the audio stream of the active telephone call comprises;

the computing system requesting that the intermediary system begin recording the portion of the audio stream of the active telephone call; and the computing system requesting that the voicemail server begin playing the voicemail message as part of the audio stream of the active telephone call, wherein the intermediary system records the portion of the audio stream during the active telephone call to record the voicemail message during playback thereof as part of the audio stream;

storing the recorded portion of the audio stream, wherein the stored recorded portion of the audio stream comprises the voicemail message; automatically isolating the voicemail message from the recorded portion of the audio stream by removing at least some content of the recorded portion of the audio stream; and sending the isolated voicemail message to a remote backup server for backup of the voicemail message.

21. A method to facilitate backing up one or more voicemail messages, the method comprising:

establishing, by a processor of an intermediary system, an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message;

passing to the voicemail server a request from the client computing system to begin playback of the voicemail message as part of the audio stream passing through the intermediary system;

receiving the audio stream from the voicemail server during the active telephone call, wherein the voicemail message is played back as part of the audio stream;

commencing recording, by the intermediary system, of at least a portion of the audio stream of the active telephone call, the portion of the audio stream comprising the voicemail message, wherein the portion of the audio stream is recorded as it is being received during the active telephone call, and wherein recording the portion of the audio stream records the voicemail message during playback thereof as part of the audio stream; automatically isolating the voicemail message from the recorded portion of the audio stream by removing at least some content of the recorded portion of the audio stream; and sending the isolated voicemail message to a remote backup server or to the client computing system.

22. The method of claim 21, wherein the recording commences based on receiving an indication from the client computing system that recording is to be commenced.

23. The method of claim 22, wherein the method further comprises, based on receiving an indication from the client computing system, halting recording, by the intermediary system, of the portion of the audio stream.

24. The method of claim 21, wherein recording is commenced automatically based on at least one property of the audio stream.

25. The method of claim 24, wherein the method further comprises halting recording of the portion of the audio stream based on the at least one property of the audio stream.

26. The method of claim 21, wherein the method further comprises providing the recorded portion of the audio stream to at least one of the client computing system or a remote backup server.

27. The method of claim 21, wherein the intermediary system comprises a voice over Internet Protocol switch.

28. An intermediary system to facilitate backing up one or more voicemail messages, the intermediary system comprising:

a processor; and a memory in communication with the processor, wherein the intermediary system is configured to perform a method comprising:

establishing an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message;

passing to the voicemail server a request from the client computing system to begin playback of the voicemail message as part of the audio stream passing through the intermediary system;

receiving the audio stream from the voicemail server during the active telephone call, wherein the voicemail message is played back as part of the audio stream;

commencing recording of at least a portion of the audio stream of the active telephone call, the portion of the audio stream comprising the voicemail message, wherein the portion of the audio stream is recorded as it is being received during the active telephone call, and wherein recording the portion of the audio stream records the voicemail message during playback thereof as part of the audio stream automatically isolating the voicemail message from the recorded portion of the audio stream by removing at least some content of the recorded portion of the audio stream; and sending the isolated voicemail message to a remote backup server or to the client computing system.

29. A computer program product to facilitate backing up one or more voicemail messages, the computer program product comprising:

a tangible storage medium storing program instructions readable by a processor of an intermediary system for execution to perform a method comprising:

establishing, by the processor of the intermediary system, an active telephone call between a client computing system and a voicemail server storing a voicemail message, wherein the intermediary system is a separate component from the client computing system and the voicemail server, wherein an audio stream of the active telephone call passes through the intermediary system and comprises the voicemail message;

passing to the voicemail server a request from the client computing system to begin playback of the voicemail message;

receiving the audio stream from the voicemail server during the active telephone call, wherein the voicemail message is played back as part of the audio stream;

commencing recording of at least a portion of the audio stream of the active telephone call, the portion of the audio stream comprising the voicemail message, wherein the portion of the audio stream is recorded as it is being received during the active telephone call, and wherein recording the portion of the audio stream records the voicemail message during playback thereof as part of the audio stream automatically isolating the voicemail message from the recorded portion of the audio stream by removing at least some content of the recorded portion of the audio stream; and sending the isolated voicemail message to a remote backup server or to the client computing system.

\* \* \* \* \*